United States Patent
Takada et al.

(10) Patent No.: US 11,930,553 B2
(45) Date of Patent: Mar. 12, 2024

(54) TERMINAL AND MEASUREMENT METHOD

(71) Applicant: NTT DOCOMO, INC., Tokyo (JP)

(72) Inventors: Takuma Takada, Tokyo (JP); Hiroki Harada, Tokyo (JP); Naoki Fujimura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 367 days.

(21) Appl. No.: 17/265,390

(22) PCT Filed: Aug. 9, 2018

(86) PCT No.: PCT/JP2018/029940
§ 371 (c)(1),
(2) Date: Feb. 2, 2021

(87) PCT Pub. No.: WO2020/031332
PCT Pub. Date: Feb. 13, 2020

(65) Prior Publication Data
US 2022/0117029 A1    Apr. 14, 2022

(51) Int. Cl.
| H04W 24/10 | (2009.01) |
| H04L 25/02 | (2006.01) |
| H04W 16/32 | (2009.01) |
| H04W 76/15 | (2018.01) |
| H04W 76/28 | (2018.01) |

(52) U.S. Cl.
CPC .......... *H04W 76/28* (2018.02); *H04W 16/32* (2013.01); *H04W 76/15* (2018.02)

(58) Field of Classification Search
None
See application file for complete search history.

(56) References Cited

U.S. PATENT DOCUMENTS

| 10,903,942 | B2* | 1/2021 | Nam | H04L 1/1657 |
| 10,932,147 | B2* | 2/2021 | Huang | H04W 24/10 |
| 10,986,693 | B2* | 4/2021 | Huang | H04W 24/10 |
| 11,166,300 | B2* | 11/2021 | Deogun | H04B 7/02 |
| 11,503,559 | B2* | 11/2022 | Damnjanovic | H04B 17/318 |
| 11,533,767 | B2* | 12/2022 | Axmon | H04W 72/0446 |
| 11,575,542 | B2* | 2/2023 | Siomina | H04W 24/10 |

(Continued)

FOREIGN PATENT DOCUMENTS

| WO | 2015063591 A2 | 5/2015 |
| WO | 2016024540 A1 | 2/2016 |

OTHER PUBLICATIONS

Extended European Search Report in counterpart European Application No. 18 92 9809.4 dated Mar. 15, 2022 (7 pages).

(Continued)

*Primary Examiner* — Sithu Ko
(74) *Attorney, Agent, or Firm* — Osha Bergman Watanabe & Burton LLP

(57) ABSTRACT

A terminal is disclosed including a receiver that receives an instruction for a quality measurement of a cell in Dual Connectivity (DC), the cell being in an unconnected state; and a processor that performs the quality measurement in accordance with the instruction, wherein the processor performs the quality measurement in a measurement period based on a discontinuous reception configuration in a Secondary Cell Group (SCG). In other aspects, a measurement method for a terminal is also disclosed.

4 Claims, 5 Drawing Sheets

(56) References Cited

U.S. PATENT DOCUMENTS

| | | | | |
|---|---|---|---|---|
| 11,653,316 | B2* | 5/2023 | Dalsgaard | H04W 24/10 |
| | | | | 370/350 |
| 11,729,782 | B2* | 8/2023 | Zhang | H04W 52/242 |
| | | | | 370/336 |
| 2016/0081020 | A1* | 3/2016 | Rahman | H04W 24/10 |
| | | | | 370/311 |
| 2017/0238204 | A1* | 8/2017 | Uchino | H04W 48/16 |
| | | | | 370/252 |
| 2017/0303151 | A1* | 10/2017 | Lunden | H04W 52/0212 |
| 2017/0311370 | A1 | 10/2017 | Dalsgaard et al. | |
| 2019/0261397 | A1 | 8/2019 | Takeda et al. | |
| 2021/0105646 | A1* | 4/2021 | Siomina | H04W 24/08 |

OTHER PUBLICATIONS

Office Action issued in the counterpart Japanese Patent Application No. 2020-535428, dated Aug. 16, 2022 (5 pages).

Office Action issued in the counterpart Japanese Patent Application No. 2020-535428, dated Apr. 12, 2022 (5 pages).

3GPP TS 38.300 V15.2.0 "3rd Generation Partnership Project; Technical Specification Group Radio Access Network; NR; NR and NG-RAN Overall Description; Stage 2 (Release 15)" Jun. 2018 (87 pages).

3GPP TS 38.133 V15.2.0 "3rd Generation Partnership Project; Technical Specification Group Radio Access Network; NR; Requirements for support of radio resource management (Release 15)" Jun. 2018 (79 pages).

International Search Report issued in International Application No. PCT/JP2018/029940, mailed Oct. 23, 2018 (5 pages).

Written Opinion issued in International Application No. PCT/JP2018/029940; Dated Oct. 23, 2018 (5 pages).

Office Action issued in the counterpart Indonesian Patent Application No. P00202101554, dated Apr. 5, 2023 (6 pages).

NTT Docomo, Inc.; "Report and summary of email discussion on measurement requirements for Dual Connectivity"; 3GPP TSG-RAN Working Group 4 (Radio) Meeting #73, R4-147296; San Francisco, USA; Nov. 17-21, 2014 (6 bages).

Huawei, HiSilicon; "Consideration on DRX for EN-DC"; 3GPP TSG-RAN WG2 Meeting #99, R2-1708958; Berlin, Germany; Aug. 21-25, 2017 (2 pages).

Office Action issued in the counterpart Chinese Patent Application No. 201880096242.1, dated May 23, 2023 (14 pages).

* cited by examiner

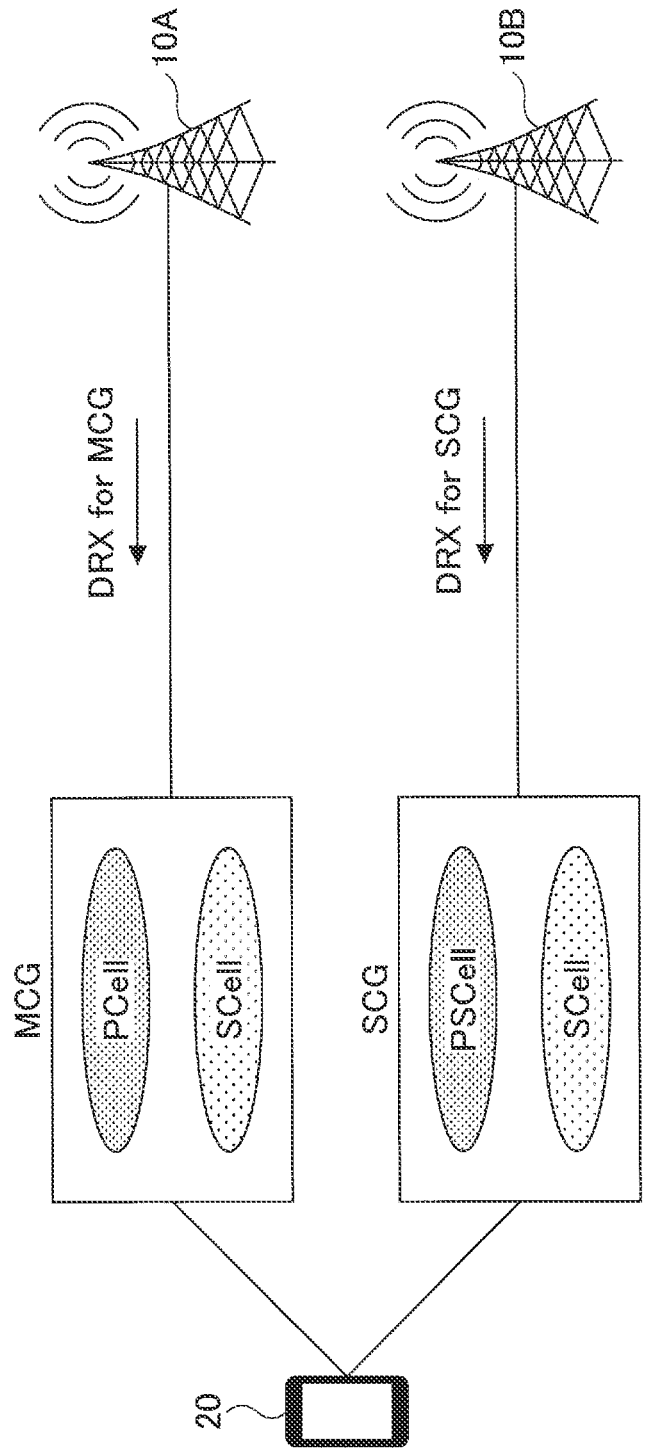

FIG.2

Table 9.2.5.2-1 Measurement period for intrafrequency measurements without gaps(Frequency FR1)

| DRX cycle | $T_{SSB\_measurement\_period}$ |
|---|---|
| No DRX | max[ 200 ms, ceil(5 × $K_p$) × SMTC period ][Note 1] |
| DRX cycle ≤ 320 ms | max[ 200 ms, ceil(1.5 × 5 × $K_p$) × max(SMTC period, DRX cycle) ] |
| DRX cycle > 320 ms | ceil(5 × $K_p$) × DRX cycle |
| NOTE 1. If different SMTC periodicities are configured for different cells, the SMTC period in the requirement is the one used by the cell being identified | |

TERMINAL AND MEASUREMENT METHOD

TECHNICAL FIELD

The present invention relates to a user device and a control method in a radio communication system.

BACKGROUND ART

In NR (New Radio) (also referred to as "5G") as a successor system to LTE (Long Term Evolution), a technology that ensures large-capacity systems, high-speed data transmission speeds, low delays, simultaneous connections of multiple terminals, low cost, power saving, and the like. has been. studied as requirements (e.g., Non-Patent Document 1).

When a user device is in a DRX (Discontinuous Reception) state, a measurement period of cell quality of a current cell and peripheral cells is specified as an integer multiple of a configured DRX cycle (e.g., Non-Patent Document 2).

RELATED-ART DOCUMENTS

Non-Patent Document

Non-Patent Document 1: 3GPP TS 38.300 V15.2.0 (2018-06)

Non-Patent Document 2: 3GPP TS 38.133 V15.2.0 (2018-06)

SUMMARY OF THE INVENTION

PROBLEM TO BE SOLVED BY THE INVENTION

In a case of Dual Connectivity (DC), the user device is connected. to a master node (Master Node (MN)) and a secondary node (Secondary Node (SN)). A DRX configuration can be set by each of the MN and SN, and is applied to each of a group of serving cells (Master Cell Group (MCG)) associated with the MN, and a group of serving cells (Secondary Cell Group (SCG)) associated with the SN.

In the case of LTE-DC, it is specified, with respect to a DRX cycle in the definition of the cell quality measurement period at DRX, that a DRX cycle set at MCG is to be applied to the measurement of PCell quality, that a DRX cycle set at SCG is to be applied to the measurement of PSCell quality, and that a DRX cycle set at MCG is to be applied to the measurement of the quality of the cell at different frequencies (unconnected).

Therefore, the measurement period will be determined based on the DRX cycle set in the MCG, even if the cell quality measurement is instructed by the MN or instructed by the SN. Therefore, if a DRX configuration differs depending on the MN and SN, or if only one of the MN and SN is in the DRX state, unintended measurement delays will occur.

The present invention has been made in view of the above-described points. A purpose of the present invention in a radio communication system is to improve connection stability of a user device by allowing appropriate control of a measurement period in consideration of a RAT (LTE or NR) and a DRX configuration for a cell to be measured with respect to the measurement of different frequency cells in a case of DC.

Means to Solve the Problem

According to a disclosed technique, a user device is provided. The user device includes a reception unit configured to receive an instruction for a quality measurement from a base station apparatus that is a master node or a secondary node, and a control unit configured to perform the quality measurement in accordance with the instruction, wherein the control unit performs the quality measurement in accordance with a predetermined discontinuous reception configuration.

Advantage of the Invention

According to the disclosed technique, connection stability of a user device in a radio communication system can be improved by allowing appropriate control of a measurement period in consideration of a RAT (LTE or NR) and a DRX configuration for a cell to be measured with respect to the measurement of different frequency cells in a case of DC.

BRIEF DESCRIPTION OF THE DRAWINGS

FIG. 1 is a diagram for describing a radio communication system according to an embodiment of the present invention;

FIG. 2 is a table illustrating definition of a quality measurement period in a case of the user device being in a DRX state;

MODE FOR CARRYING OUT THE INVENTION

An embodiment of the present invention will now be described with reference to the drawings. It should be noted that the embodiment described below is exemplary, and an embodiment to which the present invention is applied is not limited to the following embodiment.

In the operation of the wireless communication system of the embodiment of the present invention, existing techniques are optionally used. However, the existing techniques may be, for example, the existing LTE, but may be not limited to the existing LTE. Also, the term "LTE" as used herein, unless otherwise stated, is to have a broad meaning that includes the LTE-Advanced method and methods subsequent to the LTE-Advanced method (e.g., NR).

FIG. 1 is a diagram for describing a radio communication system according to the embodiment of the present invention. As illustrated in FIG. 1, the radio communication system in the embodiment of the present invention includes base station apparatuses 10A and 10B and a user device 20. When any base station apparatus is indicated, it is referred to as a base station apparatus 10.

The base station apparatuses 10A and 10B communicate with the user device 20 via a radio bearer established. with the user device 20. The base station apparatuses 10A and 10B may be referred to as "eNB (enhanced. NodeB)", "NR. (New Radio) node", "gNB (Next generation NodeB)", or the like. In this embodiment, the base station apparatus 10A is a master node (MN), and the base station apparatus 10B is a secondary node (Secondary Node (SN)).

The user device 20 is a terminal (MBB (Mobile Broad Band) terminal) that frequently transmits/receives large amounts of data, such as a smartphone, or a terminal (MTC (Machine Type Communication) terminal) that transmits/ receives small amounts of data at a low frequency, such as an IoT device. In an embodiment of the present invention, the user device 20 includes any type (UE category) of user device 20.

In a case of Dual Connectivity (DC), the user device 20 is connected to an MN (base station apparatus 10A) and an SN (base station apparatus 10B).

A DRX configuration can be set from each of the MN and SN, and is applied to a group of serving cells (MCG and SCG) associated. with each of the MN and SN PCell and SCell are associated with the MCG (Master Cell Group), and PSCell and SCell are associated with the SCG (Secondary Cell Group).

FIG. 2 is a table illustrating definition of a quality measurement period in a case of the user device described in Non-Patent Document 2 being in a DRX state. As illustrated in FIG. 2, the quality measurement period of an own cell and peripheral cells in a case of the user device being in the DRX state is defined as an integer multiple of a configured DRX cycle.

Figure 3:
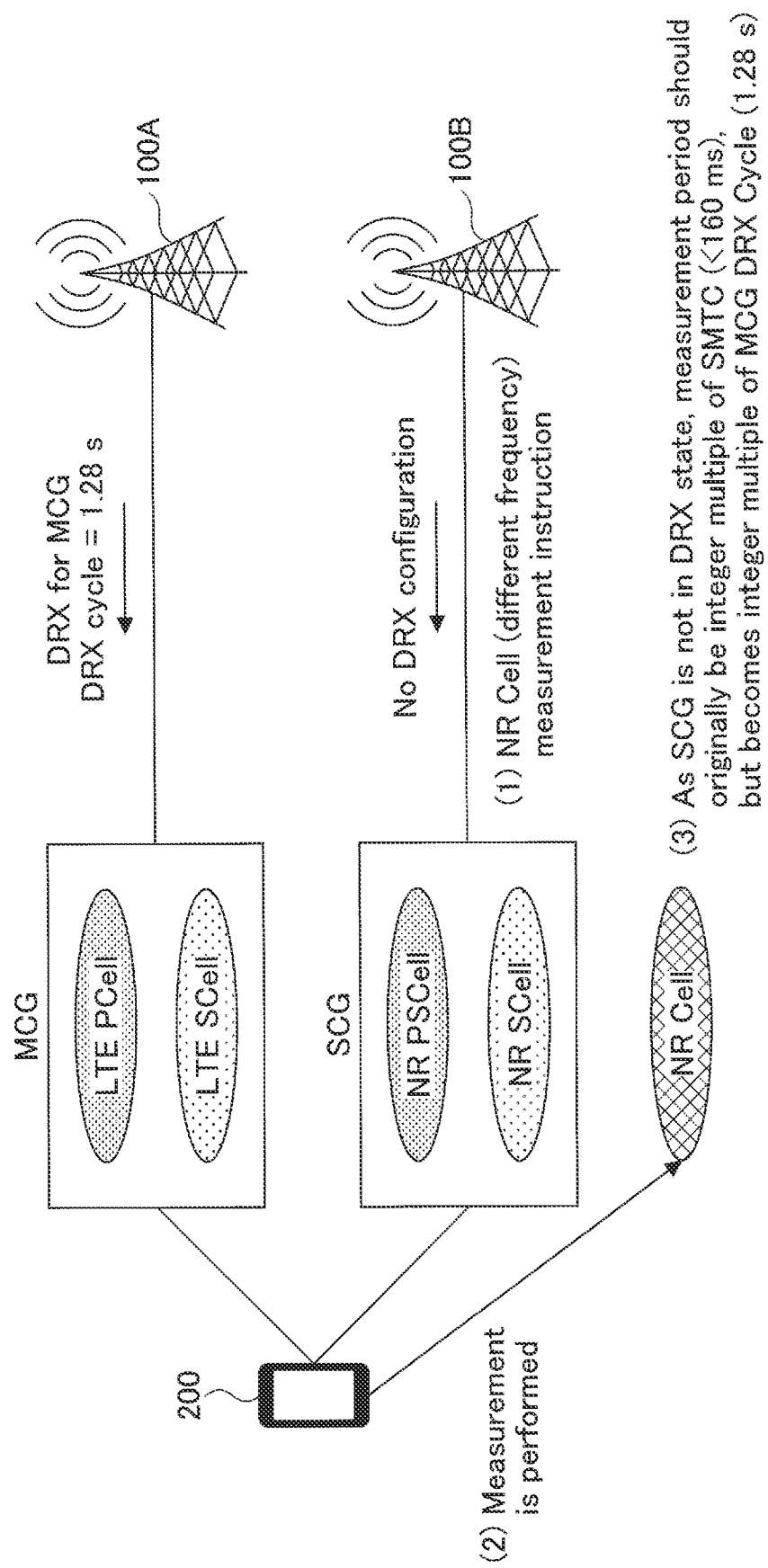
FIG. 3 is a diagram illustrating an example of EN-DC.

FIG. 3 is a diagram illustrating an example of EN-DC (E-UTRA-NR Dual Connectivity).

In the example of FIG. 3, the RAT (Radio Access Technology) of cells comprising the MCG is LTE, and the RAT of cells comprising the SCG is NR. For MCG, a DRX configuration is set by MN (base station apparatus 100A) and the DRX Cycle is set to 1.28 seconds. No DRX configuration is set for the SCG.

In. FIG. 3 (1), a user device 200 receives an NR Cell (different frequency) measurement instruction from the SN (base station apparatus 100B).

In FIG. 3 (2), the user device 200 performs cell quality measurements.

In. FIG. 3(3), because the SCG is not in a DRX state, the measurement period should originally be an integer multiple of SMTC (SSB-based measurement timing configuration) (<160 ms), becomes an integer multiple of the DRX Cycle (1.28 seconds) set in the MCG.

Figure 4:
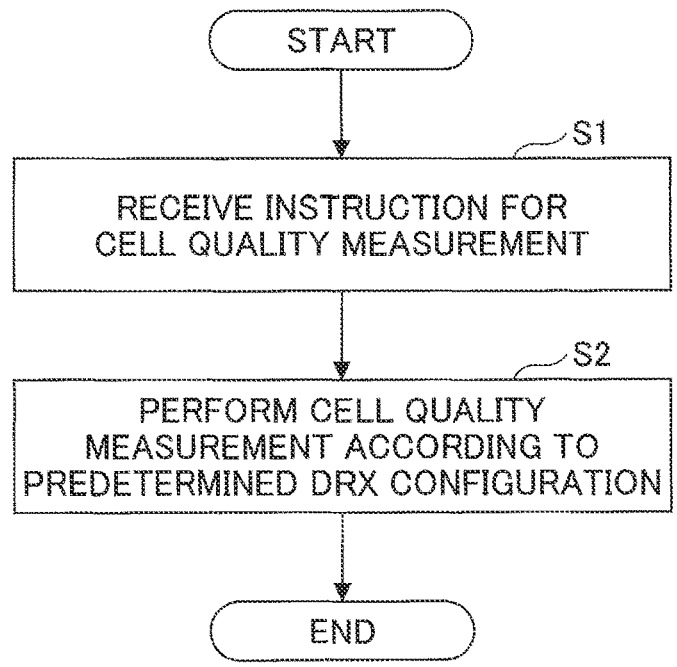
FIG. 4 is a flow chart for describing operation in the embodiment of the present invention.

FIG. 4 is a flow chart for describing operation in the embodiment of the present invention. As illustrated in. FIG. 4, in the embodiment of the present invention, the user device 20 performs cell quality measurements according to predetermined DRX configurations.

In a step S1, the user device 20 receives a different frequency measurement instruction from an MN or SN.

In a step S2, the user device 20 performs a cell quality measurement according to a predetermined DRX configuration.

More specific operation methods of the user device 20 when executing the cell quality measurement according to a predetermined DRX configuration in the step S2 will be described.

(Operation Method 1)

As an operation method 1, the user device 20 may perform the cell quality measurement in accordance with a DRX configuration in a cell group (Cell Group (CG)) of a RAT of a cell to be measured, regardless of which of the MN and SN has instructed the cell quality measurement.

For example, the measurement period of an LTE cell is determined in accordance with the DRX configuration in a CG of LTE. The measurement period of an NR cell follows the DRX configuration in a CG of NR.

If both MCG and SCG are in the DRX state, a measurement period may be determined in accordance with either one of DRX cycles.

(Operation Method 2)

As an operation method 2, the user device 20 may follow the DRX configurations at a node (MN or SN) that instructs a quality measurement to the user device 20.

For example, if the MN instructs, the measurement is performed according to the DRX configuration of the MCG, whereas if the SN instructs, the measurement is performed according to the DRX configuration of the SCG.

(Operation Method 3)

As an operation method 3, the user device 20 may be instructed as to which of DRX configurations for the MN and SN should be applied in a case of the network side instructing the quality measurement.

For the application of the operation method 1, the operation method 2, and the operation. method 3 described above, the application or non-application of the operation method 1, the operation method 2, and the operation method 3 may be changed depending on whether they are applied to a case of EN-DC or other cases (a case of NR standalone, a case of NR-NR DC, and a case of NE-DC).

In addition, the measurement periods in the above-described operation method 1, operation method 2, and operation method 3 may be applied to the measurement period in Radio link monitoring (RLM) or Beam failure detection (BFD).

(Device Configuration)

An example of a functional arrangement of the base station apparatus 10 and. the user device 20 for performing tasks and operations described heretofore is described next. The base station apparatus 10 and the user device 20 include functions for executing the above-described embodiment. However, each of the base station apparatus 10 and the user device 20 may include merely some functions of the embodiment.

<Base Station Apparatus 10>

Figure 5:
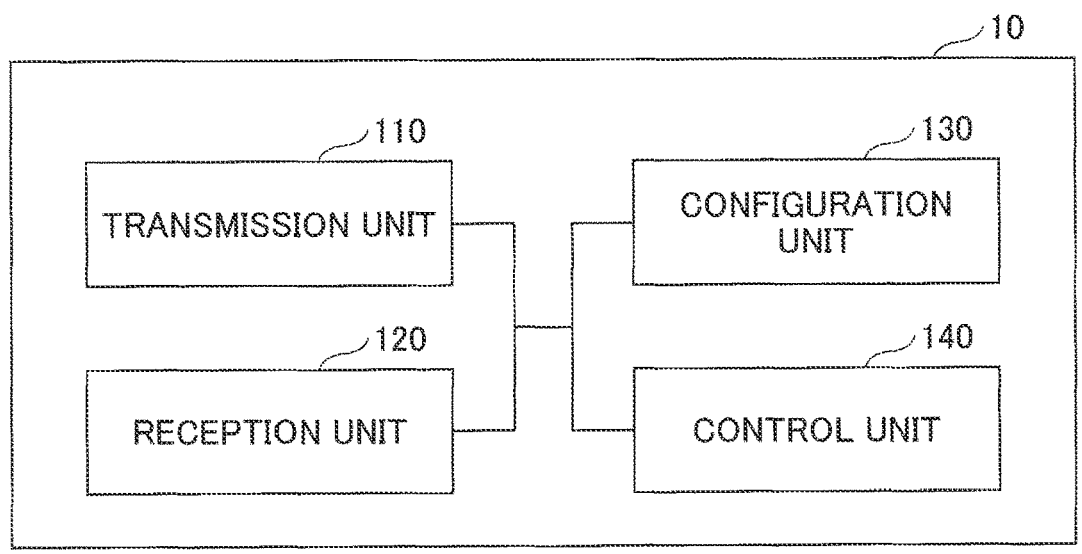
FIG. 5 is a diagram illustrating an example of a functional configuration of a base station apparatus 10 according to the embodiment of the present invention.

FIG. 5 is a diagram illustrating an example of a functional configuration of the base station apparatus 10. As illustrated in FIG. 5, the base station apparatus 10 includes a transmission unit 110, reception unit 120, a configuration unit 130, and a control unit 140. The functional configuration illustrated in FIG. 5 is only one example. If the operation according to an embodiment of the present invention can be performed, the functional category and the name of the functional part may be determined optionally.

The transmission unit 110 includes a function for generating a signal to transmit to the side or the user device 20, and for transmitting this signal wirelessly. The reception unit 120 has a function for receiving various types of signals transmitted by the user device 20, and obtaining information from the received signals, for example, information of a higher layer. Also, the transmission unit 110 transmits a cell measurement instruction to the user device 20.

The configuration unit 130 stores preconfigured configuration information and various types of configuration information, to be transmitted to the user device 20, into the storage device, and reads out the configuration information from the storage device as needed.

As described in the embodiment, when the base station apparatus 10 is an MN, the control unit 140 sets a DRX for a group (MCG) of serving cells that is associated with the MN via the transmission unit 110, and whereas when the base station apparatus 10 is an SN, the control unit 140 sets a DRX for a group (SCG) of serving cells that is associated with the SN via the transmission unit 110. A functional component for transmitting signals in the control unit 140 may be included. in the transmission. unit 110, and a functional component for receiving signals in the control unit 140 may be included in the reception unit 120.

<User Device 20>

Figure 6:
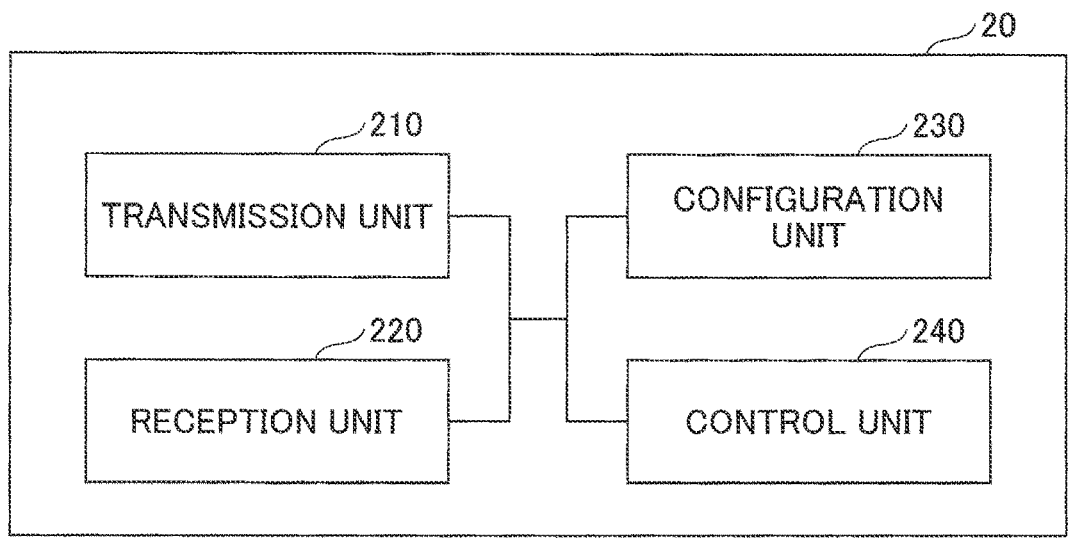
FIG. 6 is a diagram illustrating an example of a functional configuration of a user device 20 according to the embodiment of the present invention.

FIG. 6 is a diagram. illustrating an example of a functional configuration of the user device 20. As illustrated in FIG. 6, the user device 20 includes a transmission unit 210, a reception unit 220, a configuration unit 230, and a control unit 240. The functional configuration. illustrated in FIG. 6 is only one example. If the operation according to an embodiment of the present invention can be performed, the functional category and the name of the functional part may be freely determined.

The transmission unit 210 generates a transmission signal from transmission data, and wirelessly transmits this signal for transmission. The reception unit 220 wirelessly receives various signals, and obtains signals of higher layers from the received signals of the physical layer. Also, the reception unit 220 receives a cell measurement instruction from the base station apparatus 10 that is an MN or SN.

The configuration unit 230 stores various types of configuration information, received by the reception unit 220 from the base station apparatus 10 or the user device 20, into the storage device, and reads out the configuration information from the storage device as needed. The configuration unit 230 also stores preconfigured configuration information.

As described in the embodiment, the control unit 240 performs a cell quality measurement according to an instruction of the cell quality measurement received. from the base station apparatus 10. The control unit 240 performs the cell quality measurement according to a predetermined DRX configuration.

(Hardware Configuration)

The block diagrams (FIGS. 5 and 6) used in the description of the above-described embodiment illustrate blocks of functional units. These functional blocks (components) are implemented by any combination of at least one of hardware and software. Further, the method of implementing each functional block is not particularly limited. That is, each functional block may be implemented using one device that is physically or logically coupled, or two or more devices that are physically or logically separated may be connected directly or indirectly (e.g., using wires, wirelessly, etc.) and implemented using a plurality of these devices. Functional blocks may be implemented in combination with software in one or more of the above-described devices.

Functions include, but are not limited to, judgment, determination, decision, computing, calculation, processing, derivation, investigation, discovery, confirmation, reception, transmission, output, access, resolution, selection, choosing, establishment, comparison, assumption, expectation, regarding, broadcasting, no communicating, forwarding, configuring, reconfiguring, assignment (allocating and mapping), and assigning. For example, a functional block (component) that functions to transmit may be called a transmitting unit or a transmitter. None of these are particularly limited in their implementation as described above.

Figure 7:
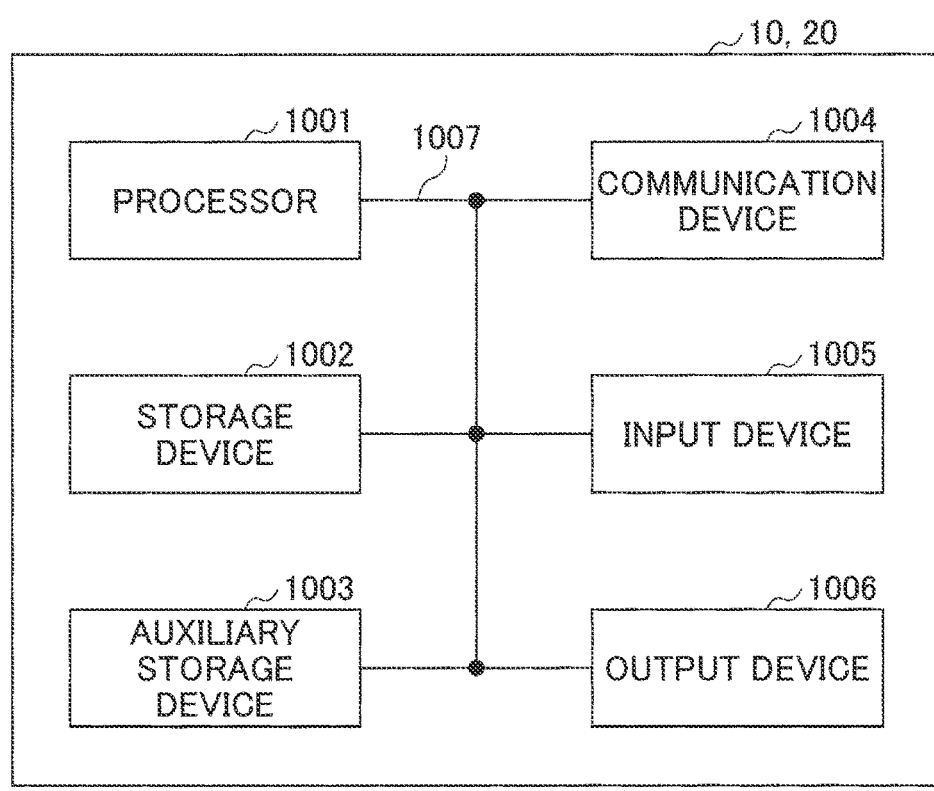
FIG. 7 is a diagram illustrating an example of a hardware configuration. of the base station apparatus 10 or the user device 20 according to the embodiment of the present invention.

For example, the base station apparatus 10, the user device 20 or the like in one embodiment of the present disclosure may function as a computer that performs processing in accordance with the embodiment of the present disclosure. FIG. 7 is a diagram illustrating an example of a hardware configuration of the base station apparatus 10 and the user device 20 according to one embodiment of the present disclosure. The base station apparatus 10 and user device 20 described above may be physically configured as a computer device including a processor 1001, a storage device 1002, an auxiliary storage device 1003, a communication device 1004, an input device 1005, an output device 1006, a bus 1007 and the like.

Note that, in the following description, the term "apparatus" may be replaced. with a circuit, device, unit and the like, The hardware configuration of the base station apparatus 10 and the user device 20 may be configured to include one or more of the respective devices illustrated in the figures and denoted at 1001-1006, or may be configured without including a part of the devices.

Each function in the base station apparatus 10 and the user device 20 is achieved by having the processor 1001 read predetermined software (program) on hardware such as the storage device 1002 to perform the operation by the processor 1001, to control communication by the communication device 1004 or to control at least one of reading and writing data in the storage device 1002 and the auxiliary storage device 1003.

The processor 1001, for example, causes an Operating System to operate so as to control the entire computer. The processor 1001 may be formed. of a central processing unit (CPU: Central Processing Unit) including an interface with a peripheral device, control device, arithmetic unit, registers, and the like.

The processor 1001 also reads programs (program code), software modules, data and the like from at least one of the auxiliary storage device 1003 and the communication device 1004 to the storage device 1002, and performs various processing in accordance therewith. As a program, a program that causes a computer to execute at least a portion of the operation, described in the above-described embodiment, is used. For example, the transmission unit 110, the reception unit 120, the configuration unit 130 and the control unit 140 of the base station apparatus 10 illustrated in FIG. 3 may be implemented by a control program stored in the storage device 1002 and operating in the processor 1001. For example, the transmission unit 210, the reception unit 220, the configuration unit 230 and the control unit 240 of the user device 20 illustrated in FIG. 4 may be implemented by a control program stored in the storage device 1002 and operating in the processor 1001. While the various processes described above have been described as being executed by one processor 1001, they may be executed simultaneously or sequentially by two or more processors 1001. The processor 1001 may be implemented by one or more chips. The program may be transmitted from the network via an electrical communication line.

The storage device 1002 is a computer readable recording medium, and may be formed of, for example, at least one of a ROM (Read Only Memory), EPROM (Erasable Programmable ROM), EEPROM (Electrically Erasable Programmable RAM), RAM (Random Access Memory) and the like. The storage device 1002 may be referred to as a register, cache, main memory (main storage device) and the like. The storage device 1002 can store a program (program code), software module and the like executable for performing processing according to one embodiment of the present disclosure.

The auxiliary storage device 1003 is a computer readable storage medium and may comprise, for example, at least one of an optical desk, such as a CD-ROM (Compact Disc ROM), hard. disk drive, flexible disk, optical magnetic disk (e.g., compact disk, digital versatile disk, and Blu-ray (registered trademark) disk), smart card, flash memory (e.g., a card, stick, and key drive.), floppy (registered trademark) disk, magnetic strip, and the like. The auxiliary storage device 1003 may be referred to as an auxiliary storage device. The storage medium described above may be, for example, a database, server, or other suitable medium including at least one of the storage device 1002 and the auxiliary storage device 1003.

The communication device 1004 is hardware (transmission/reception device) for executing communication between computers through a wired and/or wireless network, and is also referred to as, for example, a network device, network controller, network card, communication module, and the like. The communication device 1004 may include, for example, a high frequency switch, duplexer, filter, frequency synthesizer, or the like to achieve at least one of a frequency division duplex (FDD) and a time division duplex (TOD). For example, the transmission unit 110 and the reception. unit 120 in the base station apparatus 10 may be implemented by the communication device 1004. Also, the transmission unit 210 and the reception unit 220 in the user device 20 may be implemented by the communication device 1004.

The input device 1005 is an input device (e.g., a keyboard, mouse, microphone, switch, button, sensor, etc.) that receives an external input. The output device 1006 is an output device (e.g., a display, speaker, LED lamp, and the like) that perform outgoing output. The input device 1005 and the output device 1006 may be of an integrated configuration (e.g., a touch panel).

Furthermore, the respective devices, such as the processor 1001 and the storage device 1002, are connected by the bus 1007 for communication of information. The bus 1007 may be formed of a single bus, or may be formed of different buses among the devices.

Also, the base station apparatus 10 and the user device 20 may each include hardware such as a microprocessor, digital signal processor (DSP), ASIC (Application. Specific Integrated Circuit), PLD (Programmable Logic Device), and FPGA (Field Programmable Gate Array), and the hardware may implement some or all of respective functional blocks. For example, the processor 1001 may be implemented using at least one of these hardware components.

(Summary of the Embodiment)

As described above, according to the embodiment of the present disclosure, there is provided a user device having a reception. unit configured. to receive an instruction for a cell quality measurement from a base station apparatus, and a control unit configured to perform the cell quality measurement in accordance with the instruction, wherein the control unit performs the cell quality measurement according to a predetermined DRX configuration.

With the above configuration, the connectivity stability of the user device in the radio communication system can be improved by making it possible appropriately to control the measurement period in consideration of the RAT (LTE or NR) and a DRX configuration of the cell to be measured with respect to the measurement of the different frequency cells in a case of DC.

According to an embodiment of the present disclosure, the user device 20 may perform the cell quality measurement in accordance with a DRX configuration in a cell group of a radio access technology of the cell to be measured, regardless of the base station apparatus 10.

According to an embodiment of the present disclosure, the user device 20 may perform the cell quality measurement in accordance with the DRX configuration in the base station apparatus 10 transmitting the instruction.

According to an embodiment of the present disclosure, the user device 20 may receive an instruction from the base station. apparatus 10 whether to follow the DRX configuration of the master node or whether to follow the DRX configuration. of the secondary node in a case of performing the cell quality measurement.

(Supplement to Embodiment)

While the embodiment of the present invention has been described above, the disclosed invention is not limited to such an embodiment, and those skilled in the art will understand various variants, modifications, alternatives, substitutions, and the like. Descriptions have been made using specific numerical examples to facilitate understanding of the invention, but, unless otherwise indicated, these values are merely examples, and any suitable value may be used. Classification of the items in the above description is not essential to the present invention. The items described in two or more items may be used in combination as needed, or the items described in one item may be applied (unless contradicted) to the items described in another item. The boundaries of functional parts or processing parts in the functional block diagram do not necessarily correspond to the boundaries of physical parts. The operation of the plurality of functional components may be physically performed on one part, or the operation of one functional component may be physically performed on a plurality of parts. For the processing procedures described. in the embodiment, the order of processing may be changed unless there is contradiction. For the convenience of the process description, the base station apparatus 10 and the user device 20 have been described using functional block diagrams, but such devices may be implemented in hardware, software, or a combination thereof. Software operated by the processor provided in the base station apparatus 10 in accordance with the embodiment of the present invention. and software operated by the processor provided in the user device 20 in accordance with the embodiment of the present invention may be stored in random access memory (RAM), flash memory, read-only memory (ROM), EPROM, EEPROM, registers, hard disk (HDD), removable disk, CD-ROM, database, server, or any other suitable storage medium, respectively.

Notification of information is not limited to the aspects/embodiment described in this specification, and may be given by any other methods. For example, the notification of information may be performed by physical layer signaling (for example, Downlink Control Information (DCI), Uplink Control Information (UCI)), higher layer signaling (for example, Radio Resource Control (RRC) signaling, Medium Access Control (MAC) signaling, broadcast information (Master Information Block (MIB), System Information Block. (SIB))), or other signals, or a combination thereof. Further, the RRC signaling may be referred to as an RRC message and may be, for example, an RRC Connection Setup message, an RRC Connection Reconfiguration message, or the like.

Each aspect/embodiment described in the present disclosure may be applied to at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWE (Ultra-WideBand), Bluetooth (registered trademark), a system utilizing other suitable systems, and a next generation system extended thereon. Multiple systems may also be combined and applied (e.g., combinations of at least one of LTE and LTE-A with 5G, etc.).

The processing procedures, sequences, flow charts and the like of each aspect/embodiment described in. this specification may be reversed in order unless there is a contradiction. For example, the method described. in. this specification. presents elements of various steps in an exemplary order and is not limited to a presented. specific order.

The particular operation described herein to be performed. by the base station. apparatus 10 may be performed by an upper node in some cases. It is apparent that, in a network consisting of one or more network nodes having the base station apparatus 10, various operations performed for communication with user device 20 may be performed by the base station apparatus 10 and/or other network nodes (e.g., but not limited to, MME, S-GW or the like) other than the base station apparatus 10. Although one other network node other than the base station apparatus 10 is illustrated above, it may be a combination of multiple other network nodes (e.g., MME and S-GW).

The respective aspects/embodiment disclosed in the present specification can be used alone, used in combination, and used by switching in operation.

The user device 20 may be referred to by one of ordinary skill in the art as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or several other suitable terms.

The base station apparatus 10 may be referred to by those skilled in the art as NB (NodeB), eNB (evolved NodeB), gNB, base station (Base Station) or several other suitable terms.

The term "determining" as used in this disclosure may encompass a wide variety of operations. "Determining" may include, for example, deeming action of judging, calculating, computing, processing, deriving, investigating, searching (looking' up, search or inquiry) (e.g., exploring in a table, database or other data structure) and ascertaining, to be "determining" and "determining". Further, "determining" or "determining" may include deeming action of receiving (e.g., receiving information), transmitting (e-g-, transmitting information), input, output, access (e.g., accessing data in a memory) to be "determining" and "determining". Further, "determining" and "determining" may include deeming action of resolving, selecting, choosing, establishing, comparing and the like to be "determining" and "determining". In other words, "determining" and "determining" may include deeming any action to be "determining" or "determining". Further, "determining (determining)" may be read. as "assuming", "expecting", "considering", or the like.

As used in. the present specification, the phrase "based on" does not mean "based only on" unless explicitly stated otherwise. In other words, the phrase "based on" means both "based only on" and "based on at least".

As long as the terms "include", "including", and variants thereof are used herein or in the claims, these terms are intended to be comprehensive, as are the term "comprising". Furthermore, it is intended that the term "or" as used herein or in the claims is not an exclusive logical sum.

In the entirety of the present disclosure, if an article is added by translation, for example a, an and the in English, the elements with those articles can encompass a plurality of elements, unless otherwise indicated apparently in the context.

While the invention has been described in detail, it will be apparent to those skilled in the art that the invention is not limited to the embodiment described herein. The invention can be implemented as a modified or changed. form without departing from the spirit and scope of the invention as defined by the claims. Accordingly, the description herein is intended for illustrative purposes and does not have any limiting significance to the present invention.

REFERENCE SIGNS LIST

10 Base station. apparatuses
110 Transmission unit
120 Reception unit
130 Configuration unit
140 Control unit
20 User device
210 Transmission unit
220 Reception unit
230 Configuration. unit
240 Control unit
1001 Processor
1002 Storage device
1003 Auxiliary storage device
1004 Communication device
1005 Input device
1006 Output device

The invention claimed is:

1. A terminal comprising:
a receiver that receives an instruction for a quality measurement of a cell in Dual Connectivity (DC), the cell being in an unconnected state; and
a processor that performs the quality measurement in accordance with the instruction, wherein when the cell belongs to a Master Cell Group (MCG), the processor performs the quality measurement of the cell in a measurement period based on a discontinuous reception setting in the MCG, the measurement period being based on a discontinuous reception cycle,
wherein when the cell belongs to a Secondary Cell Group (SCG), the processor performs the quality measurement of the cell in a measurement period that is different from the measurement period of the MCG, based on a discontinuous reception setting in the SCG, and
wherein when the SCG is not in a discontinuous reception state, the processor performs the quality measurement in the measurement period based on a Synchronization Signal Block (SSB)-based measurement timing configuration (SMTC).

2. The terminal as claimed in claim 1, wherein the processor performs the quality measurement in the measurement period based on the discontinuous reception configuration in the SCG in a case where the receiver receives the instruction from a secondary node and where a cell to be measured belongs to the SCG.

3. The terminal as claimed in claim 2, wherein the processor performs the quality measurement in a measurement period based on a discontinuous reception configuration in the MCG when the cell to be measured belongs to the MCG, and performs switching of the measurement period of the quality measurement based on whether the cell to be measured belongs to the MCG or the SCG.

4. A measurement method for a terminal comprising:
receiving an instruction for a quality measurement of a cell in Dual Connectivity (DC), the cell being in an unconnected state; and
performing the quality measurement in accordance with the instruction, wherein when the cell belongs to a Master Cell Group (MCG), in the performing of the quality measurement, the quality measurement is performed in a measurement period based on a discontinuous reception setting in the MCG, the measurement period being based on a discontinuous reception cycle,
wherein when the cell belongs to a Secondary Cell Group (SCG), in the performing of the quality measurement, the quality measurement is performed in a measurement period that is different from the measurement period of the MCG, based on a discontinuous reception setting in the SCG, and
wherein when the SCG is not in a discontinuous reception state, performing the quality measurement in the measurement period based on a Synchronization Signal Block (SSB)-based measurement timing configuration (SMTC).

* * * * *